United States Patent [19]

Hujik

[11] 4,440,377
[45] Apr. 3, 1984

[54] MOLD FOR FOOTWEAR SOLE

[76] Inventor: Ladislav Hujik, Batawa, Ontario, Canada, K0K 1E0

[21] Appl. No.: 421,425

[22] Filed: Sep. 22, 1982

[30] Foreign Application Priority Data

May 5, 1982 [CA] Canada .................................. 402309

[51] Int. Cl.³ ............................................... B29C 1/00
[52] U.S. Cl. .................................... 249/119; 249/110; 249/121; 249/126; 249/130; 249/170; 264/297.2; 264/328.8; 425/338
[58] Field of Search ............... 249/110, 119, 121, 126, 249/129, 130, 170–172; 425/588, 338; 264/297.2, 328.8

[56] References Cited

U.S. PATENT DOCUMENTS

| 170,975 | 12/1875 | Wetmore | 249/171 |
| 3,663,145 | 5/1972 | Teraoka | 425/588 |
| 4,089,501 | 5/1978 | Zahoran | 249/171 |
| 4,309,163 | 1/1982 | Cottancin | 425/549 X |

Primary Examiner—Thomas P. Pavelko
Attorney, Agent, or Firm—George A. Seaby

[57] ABSTRACT

A book mold for producing a plurality of flat footwear soles simultaneously includes opposed top and bottom molds, each of which includes a pair of mold cavities; and an intermediate mold defined by a plate connected to one end of the bottom mold by a piano hinge. The intermediate mold is closed on the bottom mold, and the top mold is clamped on the intermediate mold using a clamping cylinder. Thermoplastic material is injected into the mold cavities through a port defined by a square slot in the intermediate mold, resulting in a large sprue in the intermediate mold. The soles remained attached to the intermediate mold, and when the mold is opened all soles are removed rapidly.

3 Claims, 5 Drawing Figures

4,440,377

MOLD FOR FOOTWEAR SOLE

BACKGROUND OF THE INVENTION

FIELD OF THE INVENTION

This invention relates to a mold, and in particular to a footwear sole mold.

DISCUSSION OF PRIOR ART

Various machines have been designed for the mass production of soles for footwear. Most such machines are somwehat complicated and cumbersome. There exists a need for a simple, yet effective machine for making footwear soles.

The object of the present invention is to meet such need at least partially by providing a relatively simple mold for molding a plurality of soles simultaneously.

GENERAL DESCRIPTION OF THE INVENTION

Accordingly, the present invention relates to a mold for molding a plurality of footwear soles comprising a bottom mold; an intermediate mold for closing on said bottom mold to define at least one first mold cavity with said bottom mold; a top mold for closing on said intermediate mold to define at least one second mold cavity with said intermediate mold; and an injection port in said intermediate mold for introducing moldable plastic material into said first and second cavities for forming said soles.

BRIEF DESCRIPTION OF DRAWINGS

The invention will now be described in greater detail with reference to the accompanying drawings, which illustrate a preferred embodiment of the invention, and wherein.

DESCRIPTION OF PREFERRED EMBODIMENTS

Figure 4:
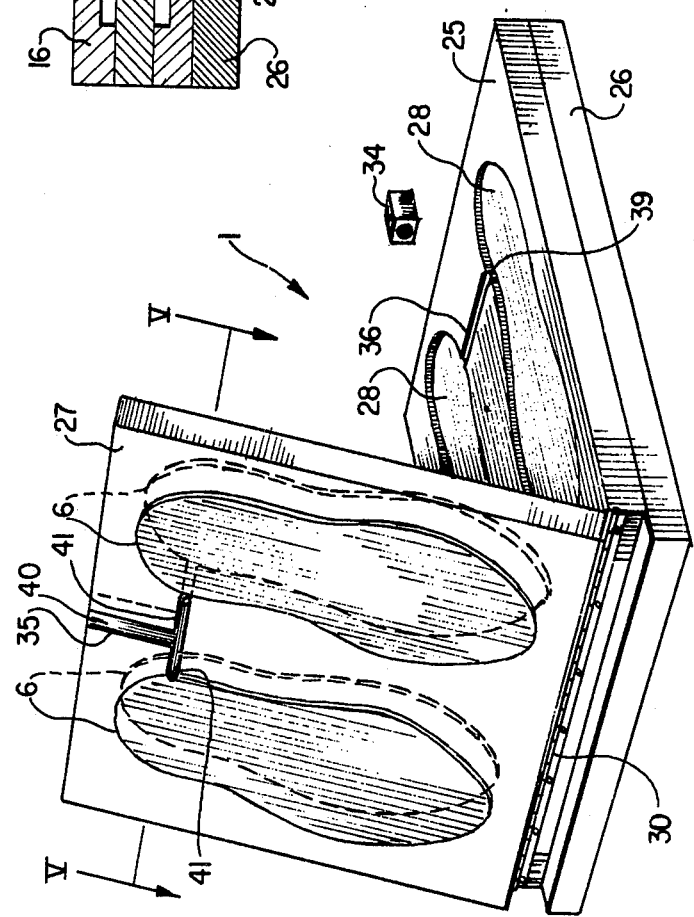
FIG. 4 is a perspective view from above of the mold of the present invention in the open position at the end of a molding operation.

With reference to the drawings, the mold of the present invention generally indicated at 1 is intended for use in a molding machine of the type including a rectangular frame 2, with adjustable feet 3. A carriage 4 at one end of the frame 2 supports an extruder 5, which is used to inject thermoplastic material e.g. polyvinyl chloride or thermoplastic rubber into the mold 1 for forming footwear soles 6 (FIG. 4). The plastic material is fed into the extruder 5 through a hopper 7. A fixed bottom platen 8 at the other end of the frame 2 supports the mold 1 of the present invention.

Figure 1:
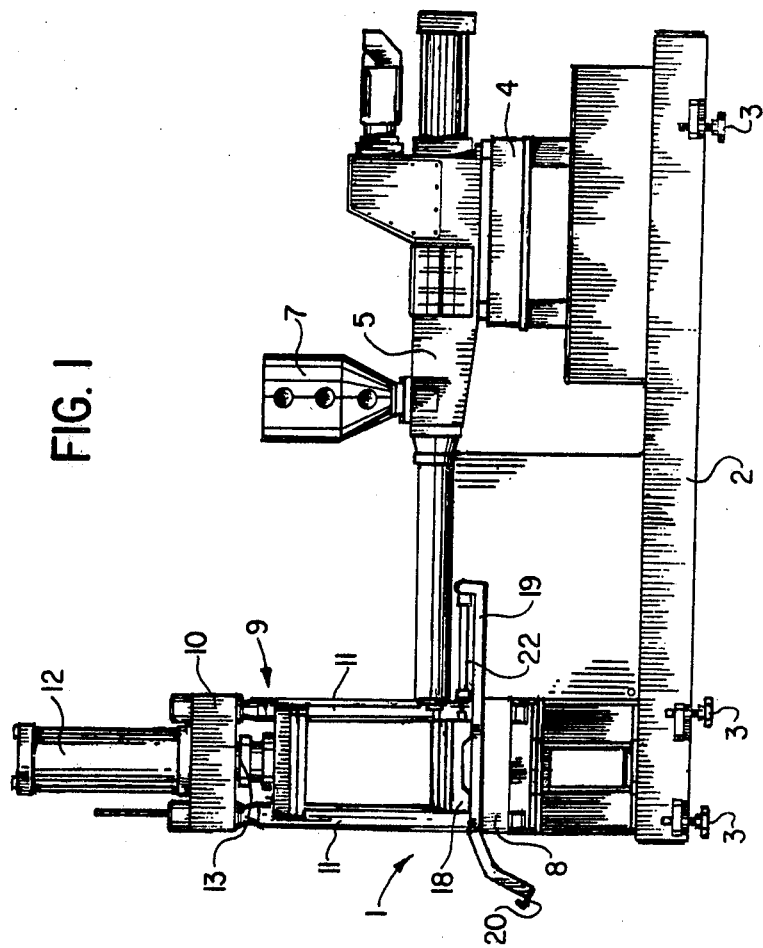
FIG. 1 is a side elevation view of a footwear sole molding machine incorporating a mold in accordance with the present invention.
Figure 3:
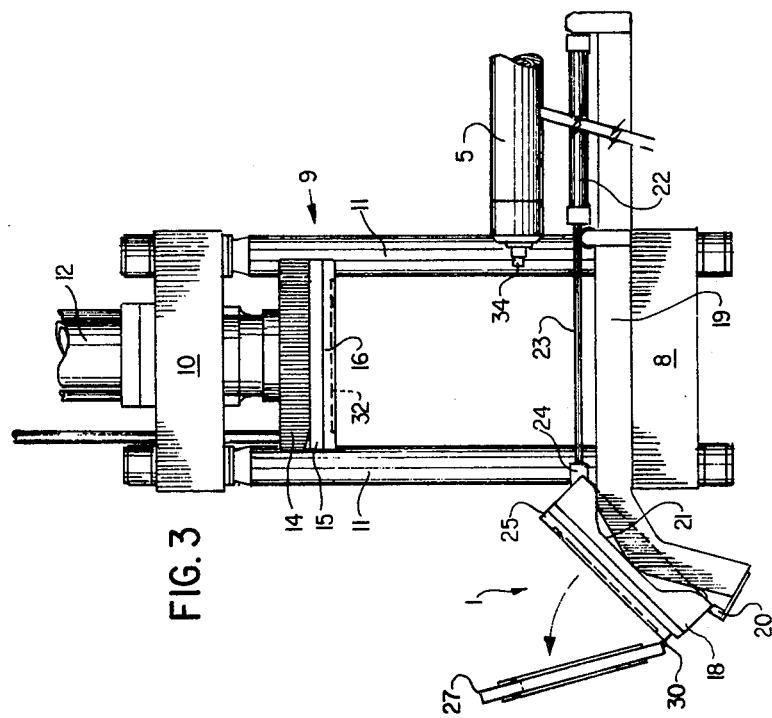
FIGS. 2 and 3 are side elevation views of the front or mold end of the machine of FIG. 1 showing the mold in the closed and open positions, respectively.
Figure 2:
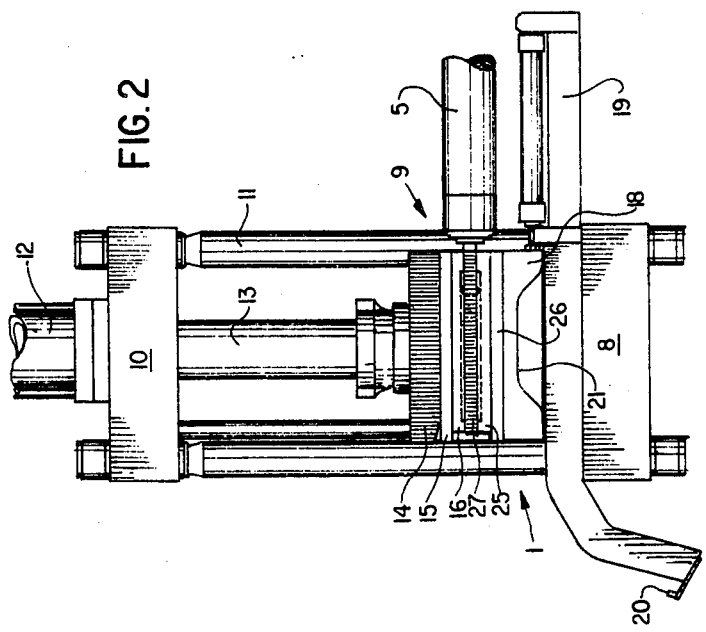

A top mold generally indicated at 9 is slidably supported above the mold 1 by a fixed top platen 10, which is mounted on posts 11. A clamping cylinder 12 is mounted on the fixed top platen 10, the piston 13 of the cylinder 12 extending downwardly through the platen 10 to the top mold assembly 9 for moving the top mold assembly between the closed and open positions (FIGS. 2 and 3, respectively). The top mold assembly 9 includes a movable platen 14 connected to the bottom of the piston rod 13, a cooling plate 15 and a top mold 16. The mold assembly 1 of the present invention is fixedly mounted on a carriage 18, which is slidable on tracks 19 (one shown) between a molding position (FIG. 2) and an uloading position (FIG. 3).

The tracks 19 are mounted on the fixed bottom template 8, and extend outwardly beyond the end of the frame 1 for carrying molded soles 6 out of the frame. The outer end of the tracks 19 slope downwardly, and are provided with end stops 20 for the carriage 18. Grooves 21 in the sides of the carriage 18 guide the carriage on the outer ends of the tracks 19. The carriage 18 is reciprocated on the tracks 19 by a cylinder 22 at the inner end of the track 19. A piston rod 23 extends outwardly from the cylinder 22 and is pivotally connected to the carriage 18 by a clevis 24.

Figure 5:
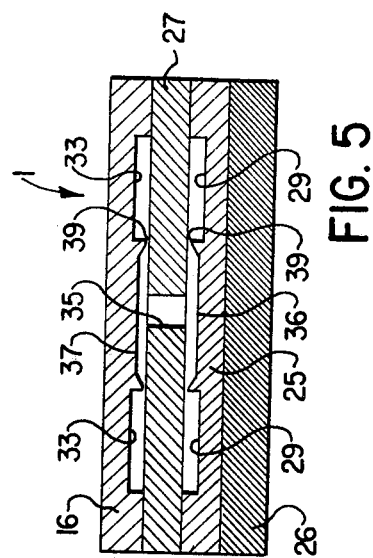
FIG. 5 is a cross-sectional view of the mold of FIG. 4, taken generally along line V—V of FIG. 4, with the mold in the closed position.

With particular reference to FIGS. 4 and 5, the mold of the present invention includes a bottom mold 25 mounted on a cooling plate 26, and an intermediate mold 27. The bottom mold 25 is provided with a pair of recesses 28, which are closed by the intermediate mold to define mold cavities 29 (FIG. 5). The intermediate mold 27 is pivotally connected to the bottom mold 25 by a piano hinge 30. The top mold 16 also includes recesses 32 (FIG. 3), which are closed by the intermediate mold 27 when the top mold 16 is moved downwardly against the intermediate mold 27 to define mold cavities 33 (FIG. 5).

Thermoplastic material is injected into all of the mold cavities 29 and 33 simultaneously from the extruder 5 through a square nozzle 34. The nozzle 34 has the same cross-sectional configuration as an injection port 35 in the intermediate mold 27. The nozzle 34 contacts the end of the intermediate mold 27 so that virtually all of the plastic enters the mold. The injection port 35 in the intermediate mold 27 is merely a rectangular slot extending through the mold, so that when the mold is closed the inner end of the slot is located between the ends of the recesses 28. A groove 36 extends between the recesses 28 in the bottom mold 25. A similar groove 37 extends between the recesses 32 in the top mold 16. The grooves 36 and 37 are positioned so that they intersect the inner end of the injection port 35. Thus, plastic material injected into the port 35 enters the grooves 36 and 37 to fill the mold cavities 29 and 33. The ends of each groove 36 and 37 are restricted to define small injection openings into the mold cavities 29 and 33.

In operation, the mold 1 is closed (FIG. 2) by moving the top mold 16 downwardly into contact with the intermediate mold 27. Thermoplastic material is injected into the injection port 35. The outer layer of the plastic material in the port 35 hardens to form a skin. Throughout the remainder of the injection, the plastic material flows through the interior of the rectangular sprue 40. Thus, there is virtually no leakage of plastic around the inlet to the injection port 35. The mold 1 is opened, i.e. the top mold assembly 9 is moved upwardly (FIG. 3). The piston rod 23 is extended to move the bottom mold 25 and intermediate mold 27 out of the frame 2 on the carriage 18. The intermediate mold 27 is opened (FIG. 4) and all of the soles 6 are removed therefrom. Because of the large sprue 40, the soles remain on the intermediate mold 27 during opening of the mold. The sprue 40 is connected to the soles 6 by small, transversely extending sprues 41.

The mold of the present invention is best suited to the mass production of thin soles, which harden rapidly in the mold cavities, and which can readily be removed from the mold cavities.

Of course, a single mold cavity could be provided between each of the top and bottom molds, and the intermediate mold, or alternatively more mold cavities could be provided between the top, intermediate and bottom molds. It is readily apparent that the intermediate mold could be connected to the top mold rather than the bottom mold. However, it would then be necessary to provide means for holding the intermediate mold against the top mold in the closed position before lowering such molds onto the bottom mold.

I claim:

1. A mold for molding a plurality of footwear soles comprising a bottom mold; an intermediate mold; hinge means pivotally connecting said intermediate mold to said bottom mold, whereby said intermediate mold can be rotated between an open position and a closed position on said bottom mold for defining at least one first mold cavity with said bottom mold; a vertically movable top mold for closing on said intermediate mold to define at least one second mold cavity with said intermediate mold; and an injection port in said intermediate mold for introducing moldable plastic material into said first and second cavities for forming said soles on said intermediate mold, whereby, when the mold is opened by moving said top mold away from said intermediate mold, the intermediate mold can be rotated to the open position for discharging the molded soles.

2. A mold according to claim 1 wherein said intermediate mold includes a plate, said hinge means connecting one end of said plate to said bottom mold; each of said bottom mold and top mold including a recess for defining a said mold cavity with said plate.

3. A mold according to claim 2, including a slot extending longitudinally in said other end of said plate defining said injection port; and grooves in each said bottom mold and said top mold for carrying plastic material from said injection port to said mold cavities.

* * * * *